Jan. 26, 1954     H. A. BEAR     2,667,009
HOLDER FOR FISHING IMPLEMENTS
Filed Aug. 15, 1950
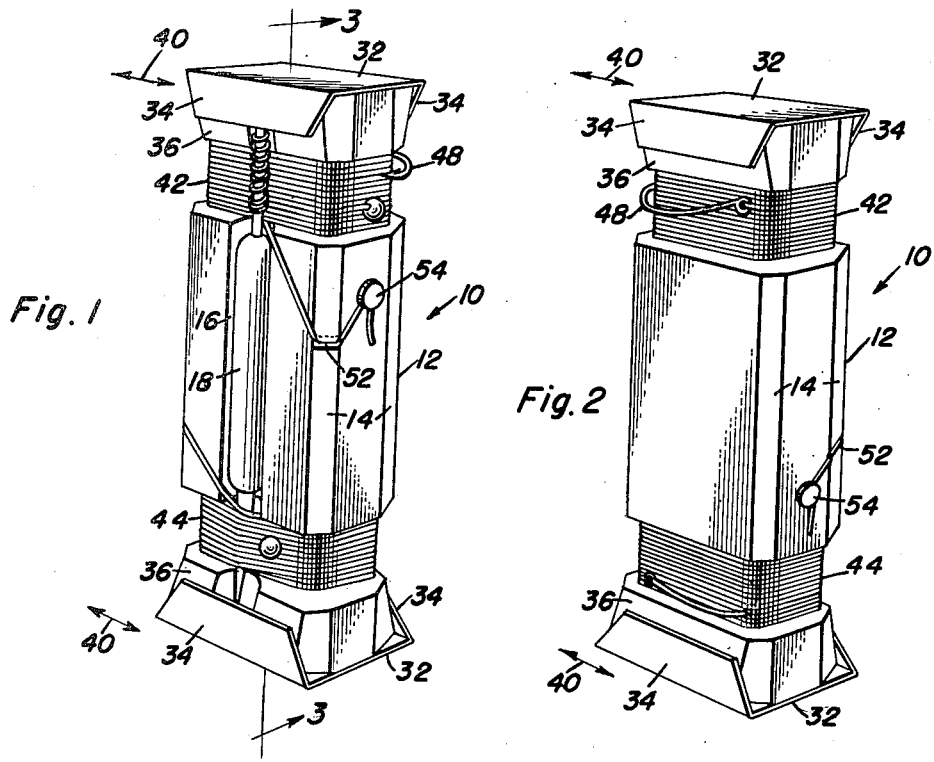
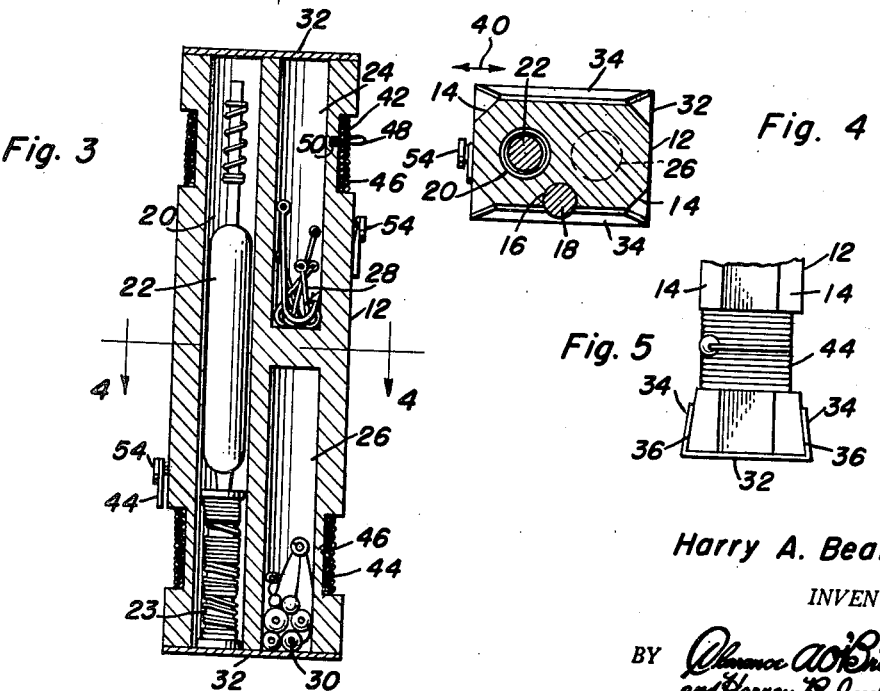
Harry A. Bear
INVENTOR.

Patented Jan. 26, 1954

2,667,009

UNITED STATES PATENT OFFICE 2,667,009

HOLDER FOR FISHING IMPLEMENTS

Harry A. Bear, Terre Haute, Ind.

Application August 15, 1950, Serial No. 179,561

1 Claim. (Cl. 43—54.5)

This invention relates to new and useful improvements and structural refinements in holders for fishing implements, and the principal object of the invention is to provide a device of the character herein described which is well adapted to accommodate several bobbers, which is provided with spool portions to have the lines of a bobber wound thereon, and which, in addition, is equipped with a plurality of compartments for the storage of sinkers, hooks, and the like.

Some of the advantages of the invention reside in its simplicity of construction, in its efficient operation, in its compactness, in its pleasing appearance, and in its adaptability to economical manufacture.

With the above more important objects and features in view and such other objects and features as may become apparent as this specification proceeds, the invention consists essentially in the construction and arrangement of parts as shown in the accompanying drawings, in which:

Figure 1 is a front perspective view of the invention;

Figure 2 is a rear perspective view thereof;

Figure 3 is a vertical sectional view, taken substantially in the plane of the line 3—3 in Figure 1;

Figure 4 is a horizontal sectional view, taken substantially in the plane of the line 4—4 in Figure 3; and Figure 5 is a fragmentary side elevational view of the lower end portion of the invention.

Like characters of reference are employed to designate like parts in the specification and throughout the several views.

Referring now to the accompanying drawings in detail, the invention consists of a fishing implement holder which is designated generally by the reference character 10 and embodies in its construction an elongated body 12 having bevelled longitudinal edges 14 and provided in one face thereof with a longitudinally extending groove 16 which affords a receptacle for a conventional bobber assembly 18.

The body 12 is also provided with a longitudinally extending, open ended bore 20 to accommodate a second bobber assembly 22, and with a pair of coaxial, blind bores 24, 26 which afford receptacles or compartments for various small items, such as for example, fishhooks 28 and sinkers 30. If desired, a leader carrying spool 23 may also be stored in the compartment 20 on one end portion of the stem of the bobber assembly 22.

The open ends of the compartments 20, 24, and 26 are adapted to be closed by a pair of caps 32 which are positioned at opposite ends of the body 12 and are equipped with convergent side flanges 34 for slidable, frictional sustaining engagement with chamfered opposite side surfaces 36 of the end portions of the body. In other words, the caps 32 may be readily separated from the body by sliding the same in the direction of the arrows 40, but undesired separation of the caps is prevented by their convergent flanges 34 which frictionally engage the surfaces 36.

It is to be noted that in addition to their primary function of providing closures for the compartments 22, 24, 26, the caps 32 also perform a secondary function, namely, the flanges 34 at one side thereof overlap the end portions of the compartment 16 and the end portions of the bobber 18 therein, whereby the bobber is sustained in position in the compartment.

The fishing lines 42, 44, such as may be used with the bobber 18, are windable upon a pair of spool portions 46 which are provided on the body 12 adjacent the opposite ends thereof, and if the lines 42, 44 are equipped with fishhooks, as indicated at 48 in Figures 1, 2 and 3, the point of the fishhook may be inserted in a recess 50 in the spool portion 46 of the body.

The other ends of the lines 42, 44 may be anchored in suitable notches 52 and around suitable studs 54 provided on the body 12, as shown.

It is believed that the advantages and use of the invention will be clearly understood from the foregoing disclosure, and accordingly further description thereof at this point is deemed unnecessary.

Having described the invention, what is claimed as new is:

In a fishing implement holder, the combination of an elongated body having a substantially rectangular cross-section and affording substantially flat front and rear faces, said body being provided in the front face thereof with a longitudinal groove extending from one end of the body to the other, the end portions of the body at the front and rear faces thereof having inwardly convergent surfaces, and a pair of end caps each having an open-ended channel-shaped configuration and including a central plate portion and a pair of convergent flanges, said end caps being frictionally slidably positioned on the respective end portions of said body with the flanges thereof engaging said convergent surfaces, one flange of each end cap extending transversely of said groove.

HARRY A. BEAR.

References Cited in the file of this patent

UNITED STATES PATENTS

| Number | Name | Date |
|---|---|---|
| 1,577,671 | Ashmead | Mar. 23, 1926 |
| 1,676,119 | Tipil | July 3, 1928 |
| 2,010,581 | Burton | Aug. 6, 1935 |
| 2,298,594 | Rueger | Oct. 13, 1942 |
| 2,499,042 | Vogel | Feb. 28, 1950 |
| 2,534,815 | Fields | Dec. 19, 1950 |